(12) United States Patent
Frank (10) Patent No.: US 7,468,656 B1
(45) Date of Patent: Dec. 23, 2008

(54) REAR-END COLLISION WARNING LIGHT SYSTEM

(76) Inventor: Donald E. Frank, 2934 60th Ave. South, St. Petersburg, FL (US) 33712

( * ) Notice: Subject to any disclaimer, the term of this patent is extended or adjusted under 35 U.S.C. 154(b) by 26 days.

(21) Appl. No.: 11/787,898

(22) Filed: Apr. 18, 2007

Related U.S. Application Data (63) Continuation-in-part of application No. 11/093,087, filed on Mar. 29, 2005, now abandoned.

(51) Int. Cl.
*B60Q 1/26* (2006.01)
(52) U.S. Cl. .................. 340/468; 340/471; 340/479
(58) Field of Classification Search ............. 340/468, 340/471, 479
See application file for complete search history.

(56) References Cited

U.S. PATENT DOCUMENTS

| | | | |
|---|---|---|---|
| 4,295,699 A | 10/1981 | DuRocher | |
| 4,648,005 A | 3/1987 | Brassington | |
| 5,874,892 A * | 2/1999 | Antonellis et al. | 340/438 |
| 6,351,211 B1 * | 2/2002 | Bussard | 340/468 |
| 6,371,572 B1 | 4/2002 | Frank | |
| 6,545,236 B2 | 4/2003 | Valk et al. | |
| 6,609,768 B1 * | 8/2003 | Frank | 303/20 |
| 6,744,361 B1 * | 6/2004 | Maddox | 340/479 |
| 6,765,483 B1 * | 7/2004 | Naqvi | 340/479 |
| 6,796,572 B1 | 9/2004 | McGhie | |
| 7,026,923 B2 * | 4/2006 | Martin | 340/464 |
| 2004/0189458 A1 * | 9/2004 | Boyer et al. | 340/479 |

* cited by examiner

*Primary Examiner*—George A Bugg
*Assistant Examiner*—Samuel J Walk
(74) *Attorney, Agent, or Firm*—Edward P. Dutkiewicz (57) ABSTRACT

A pressure sensor is positionable on the steering wheel. An emergency light is positionable on a wheeled object facing rearwardly. An electrical assembly has an input electrically coupled to the pressure sensor. The electrical assembly has an output electrically coupled to the emergency light. In this manner when a signal in the input is produced upon compression of the pressure sensor, the electrical assembly produces a signal in the output which activates the emergency light.

19 Claims, 12 Drawing Sheets

REAR-END COLLISION WARNING LIGHT SYSTEM

PRIOR APPLICATIONS

The present application is a Continuation-in-Part of a application, bearing Ser. No. 11/093,087 filed on Mar. 29, 2005 now abandoned. The present application claims the priority of the parent application.

BACKGROUND OF THE INVENTION

1. Field of the Invention

The present invention relates to a rear-end collision warning light system and more particularly pertains to alerting following drivers of dangerous situations in a more rapid and reliable manner.

2. Description of the Prior Art

The use of light systems of known designs and configurations is known in the prior art. More specifically, light systems of known designs and configurations previously devised and utilized for the purpose of alerting drivers through known methods and apparatuses are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 4,648,005 to Brassinton discloses a vehicular headlight/running lights safety flasher device. U.S. Pat. No. 4,295,699 to DuRocher discloses a pressure sensitive combination switch and circuit breaker construction. U.S. Pat. No. 6,796,572 to McGhie discloses a method for steering a transport vehicle and apparatus therefor. U.S. Pat. No. 6,545,236 to Valk et al discloses a vehicle interior component having a flexible cover with integrated circuitry. U.S. Pat. No. 6,371,572 to Frank discloses an emergency steering wheel braking system. Lastly, U.S. Pat. No. 6,609,768 to Frank discloses an emergency steering wheel braking system.

While these devices fulfill their respective, particular objectives and requirements, the aforementioned patents do not describe a rear-end collision warning light system that allows alerting following drivers of dangerous situations in a more rapid and reliable manner.

In this respect, the rear-end collision warning light system according to the present invention substantially departs from the conventional concepts and designs of the prior art, and in doing so provides an apparatus primarily developed for the purpose of alerting following drivers of dangerous situations in a more rapid and reliable manner.

Therefore, it can be appreciated that there exists a continuing need for a new and improved rear-end collision warning light system which can be used for alerting following drivers of dangerous situations in a more rapid and reliable manner. In this regard, the present invention substantially fulfills this need.

SUMMARY OF THE INVENTION

In view of the foregoing disadvantages inherent in the known types of light systems of known designs and configurations now present in the prior art, the present invention provides an improved rear-end collision warning light system. As such, the general purpose of the present invention, which will be described subsequently in greater detail, is to provide a new and improved rear-end collision warning light system and method which has all the advantages of the prior art and none of the disadvantages.

To attain this, first provided is a vehicle. The vehicle has a body. The body has a front end and a rear end. The vehicle has an interior. The vehicle has a front windshield. The vehicle has a dashboard. The front windshield is adjacent to the dashboard. The vehicle has a rear window. The vehicle has a torus shaped steering wheel. The vehicle has a plurality of wheels. Each wheel has an associated brake. The vehicle has a plurality of foot pedals. The foot pedals include an accelerator pedal and a brake pedal. A plurality of brake lights are provided. The brake lights are positioned on the rear end of the vehicle. The brake lights are electronically coupled to the brake pedal. Provided next is a pressure sensor. The pressure sensor is generally torus shaped. The pressure sensor is adapted to be positioned on the steering wheel. The pressure sensor has a first power source. The pressure sensor has a transmitter. A unique wireless signal is provided.

Provided next is a light box. The light box is adapted to be positioned adjacent to the rear window. The light box has a transparent rear face. In this manner the transparent rear face is adjacent to the rear window or located on the rear surface of a vehicle. The light box has a light located within. The light is electronically controlled by the pressure switch located on the steering wheel of the vehicle by being part of a steering wheel cover or within the steering wheel.

The light box is configured so to allow the light to be illuminated independently of the brakes, brake pedal and brake lights. Alternately, a hard wired system may be incorporated during manufacture of new vehicles, utilizing all brake lights.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved rear-end collision warning light system which has all of the advantages of the prior art light systems of known designs and configurations and none of the disadvantages.

A primary object of the present invention is preventing or minimizing injury, death and property damage resulting from more than 2,500,000 rear end collisions annually.

It is another object of the present invention to provide a new and improved rear-end collision warning light system which may be easily and efficiently manufactured and marketed.

It is further object of the present invention to provide a new and improved rear-end collision warning light system which is of durable and reliable constructions.

An even further object of the present invention is to provide a new and improved rear-end collision warning light system which is susceptible of a low cost of manufacture with regard to both materials and labor, and which accordingly is then susceptible of low prices of sale to the consuming public, thereby making such rear-end collision warning light system economically available to the buying public.

Even still another object of the present invention is to provide a rear-end collision warning light system for alterting following drivers of dangerous situations in a more rapid and reliable manner.

An even further object is to provide a switch that does not require searching in an emergency, preferably an instinctively activated switch, preferably but not limited to a 360 degree circular switch.

Lastly, it is an object of the present invention to provide a new and improved rear-end collision warning light system. A pressure sensor is positionable on the steering wheel of a vehicle. An emergency light is positionable on a vehicle facing rearwardly. An electrical assembly has an input subassembly electrically coupled to the pressure sensor. The electrical assembly has an output subassembly electrically coupled to the emergency light. In this manner when a signal in the input is produced upon compression of the pressure sensor, the electrical assembly produces a signal in the output which activates the emergency light.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 11 *a* is rearward cross sectional view of the light box in FIG. 9.

The same reference numerals refer to the same parts throughout the various Figures.

DESCRIPTION OF THE PREFERRED EMBODIMENT

Figure 1:
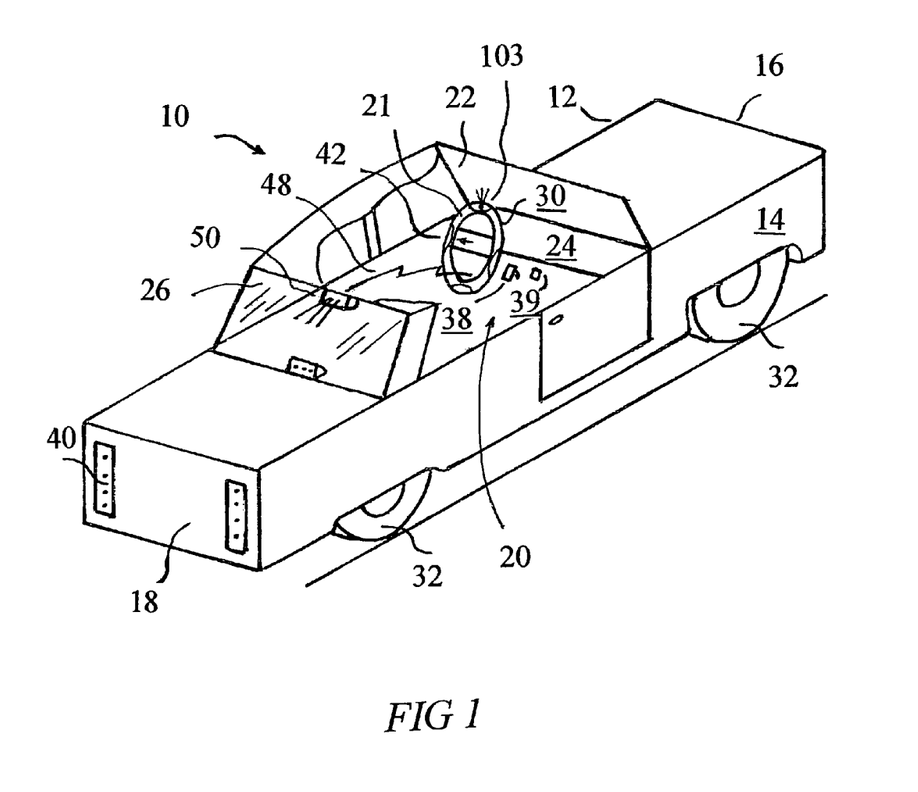
FIG. 1 is a perspective illustration of a vehicle with a rear-end collision warning light system constructed in accordance with the principles of the present invention. The after market embodiment utilizes a steering wheel cover and a wireless system to activate the emergency brake light box.
Figures 2, 3, 4:
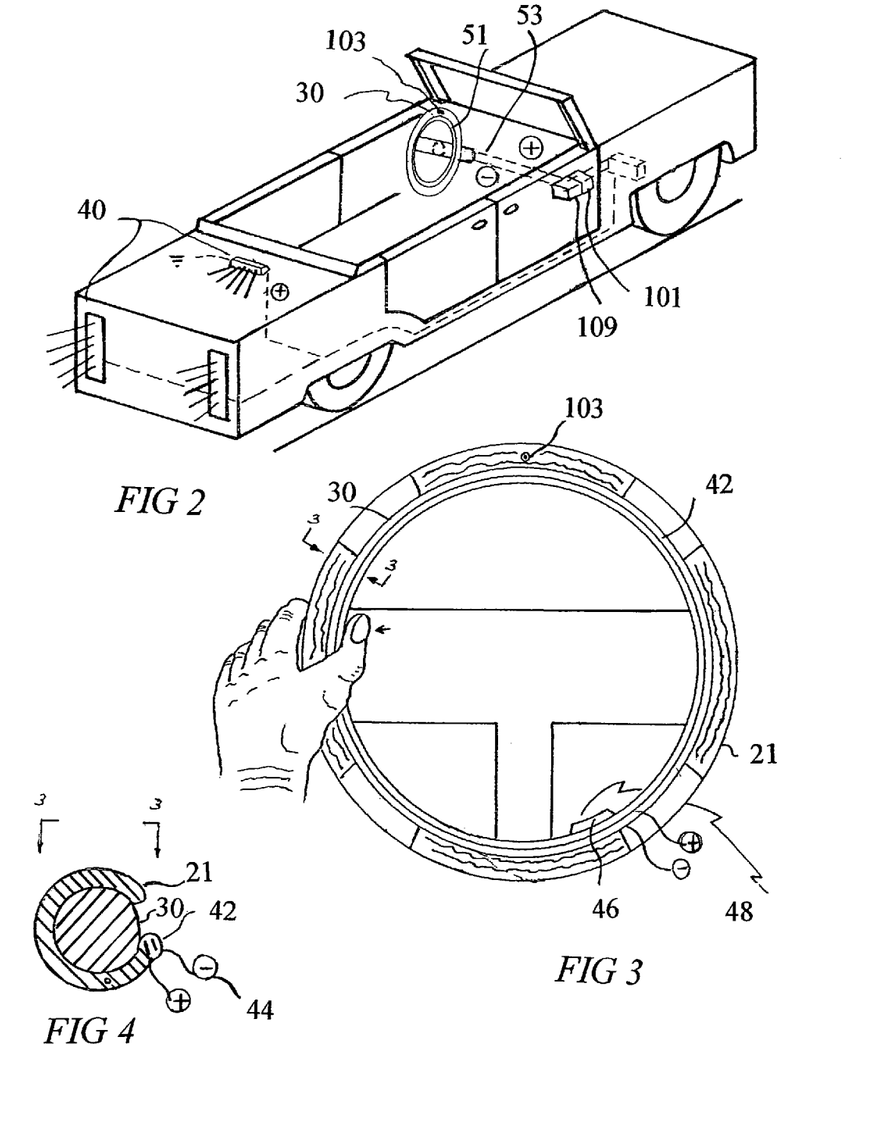
FIG. 2 is a perspective view of a vehicle having a built-in, factory installed, hard wired system utilizing all brake lights.
FIG. 3 is a view of a vehicle steering wheel cover having a system utilizing radio frequency for the illumination of the emergency brake light box.
FIG. 4 is a steering wheel cover cross section taken along line 3-3 of FIG. 3.
Figures 5, 6:
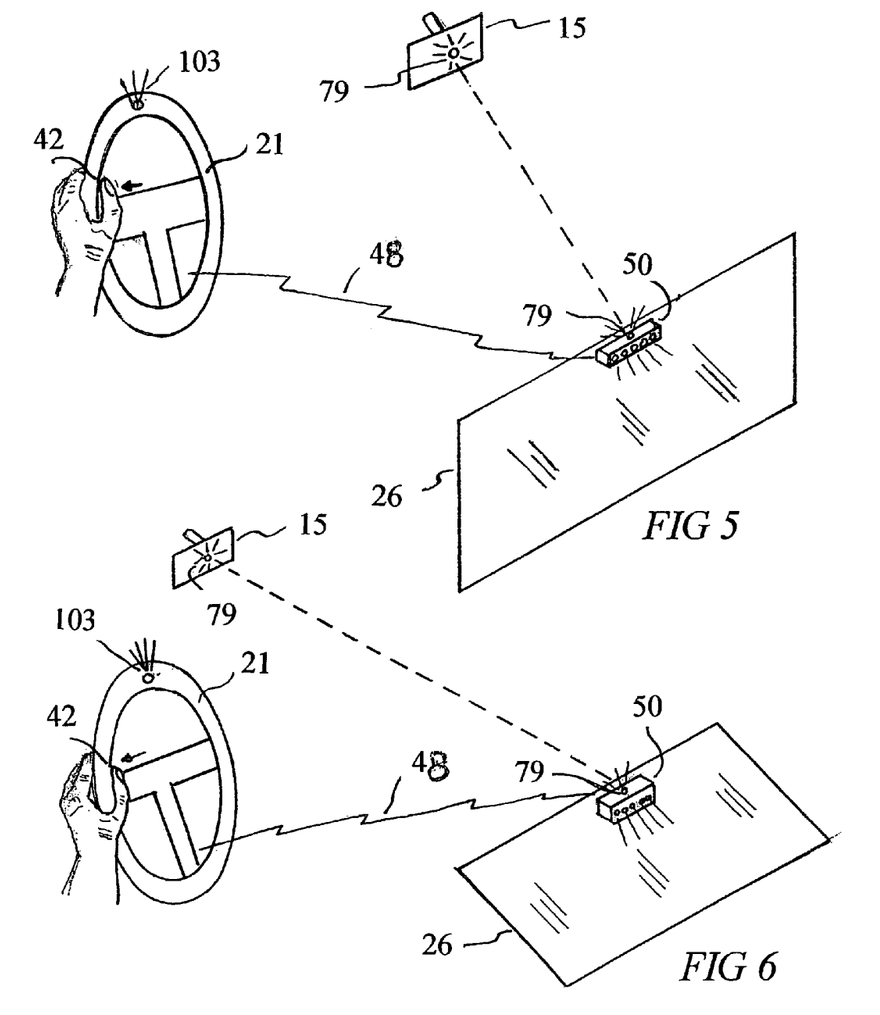
FIG. 5 is a perspective illustration of a steering wheel cover and light box that uses radio frequency to operate the emergency light. Note that the indicator LED, showing the emergency light is illuminated, is viewable in the rear view mirror of the vehicle. This allows a user to test the system and determine functionality. Note also that the rear window is vertical.
FIG. 6 is a the same view of FIG. 5 but with the window angled from the vertical position.
Figure 7:
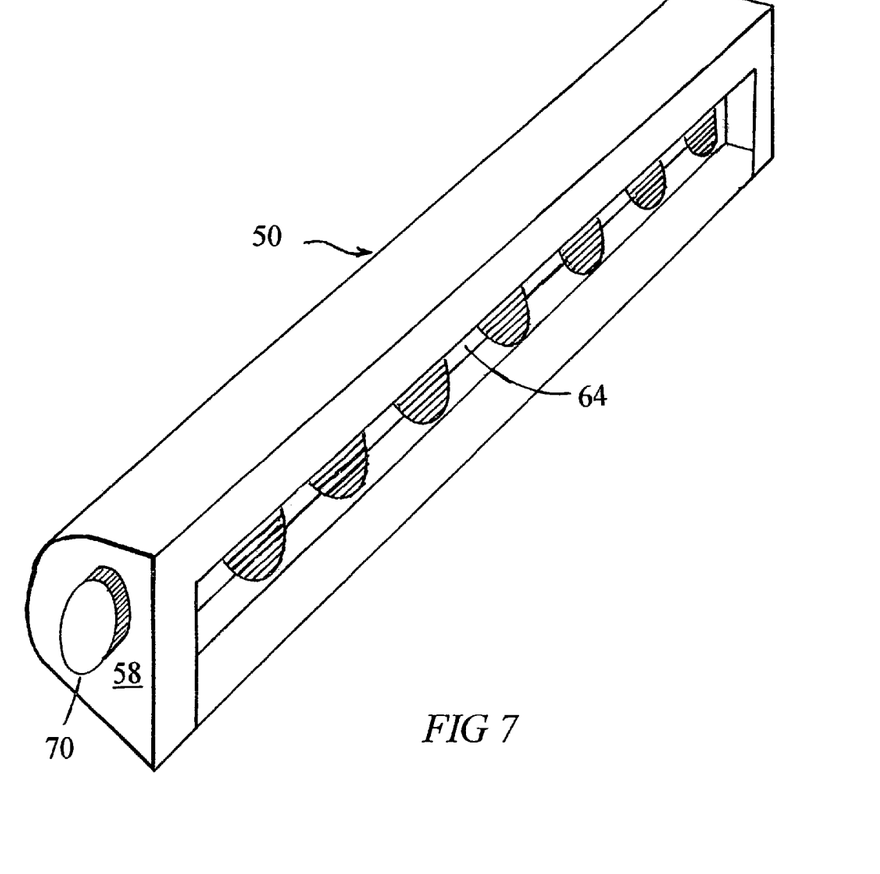
FIG. 7 is a perspective illustration of a light box. Note the screw on cap on the end to secure adjustment of the lights so as to keep the lights parallel with the ground even when installed on non-vertical windows or surfaces.
Figures 8, 9, 10:
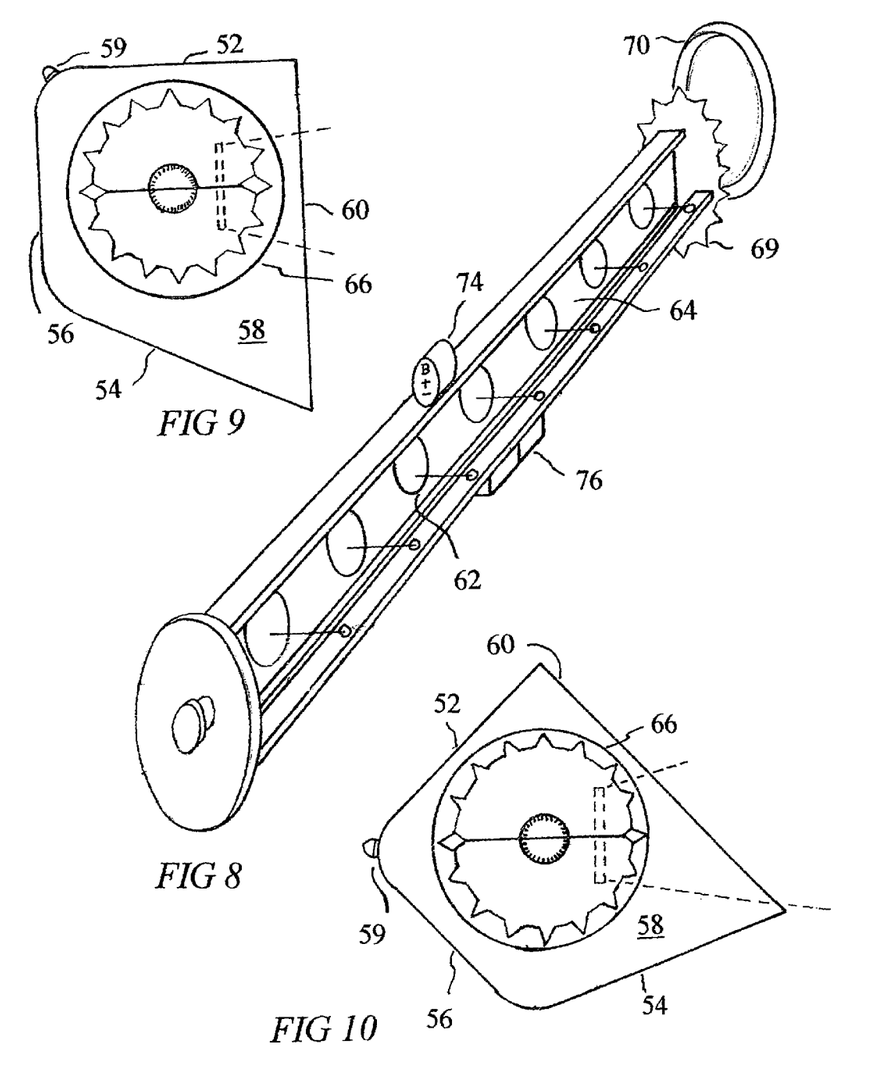
FIG. 8 is a view of the internal components of the light box.
FIG. 9 is a side elevation view of the light box showing the lights oriented for a vertical mounting surface or window.
FIG. 10 is a side elevation view of the light box showing the lights oriented for a non-vertical mounting surface or window.
Figure 11:
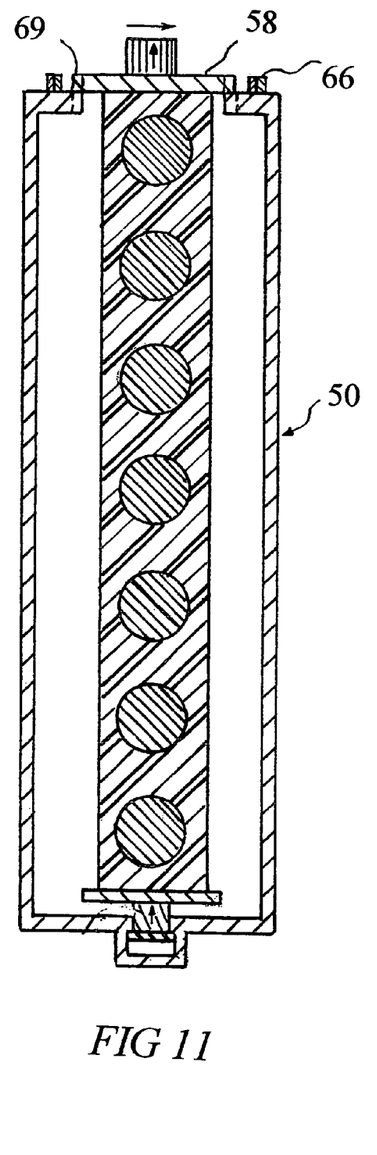
Figure 12:
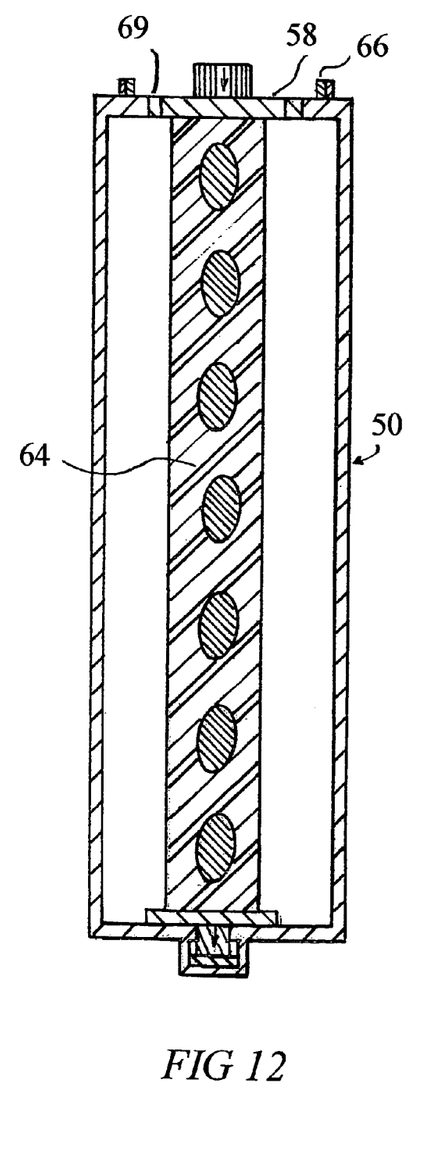
FIG. 12 is a rearward cross sectional view of the light box in FIG. 10 Note that the lights are angled.
Figure 13:
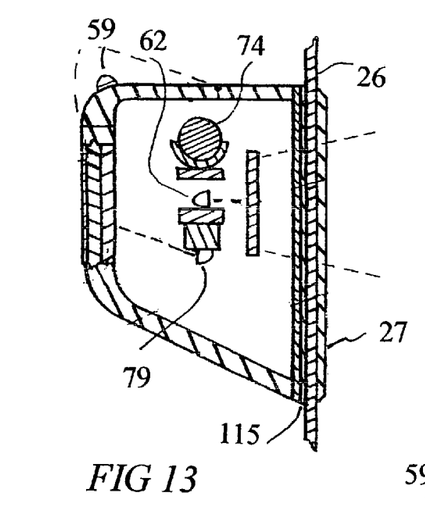
FIG. 13 is a cross sectional view of the light box of FIG. 9 wherein the light box is mounted to a vertical window surface.
Figure 14:
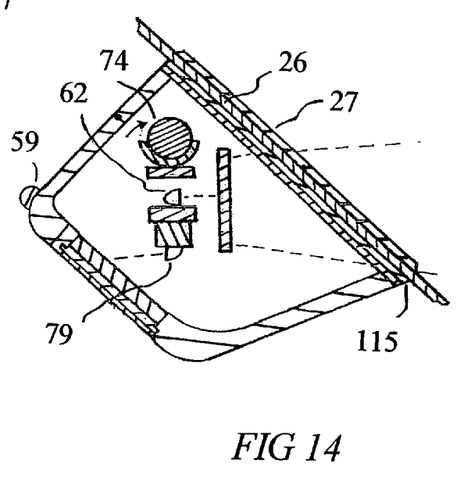
FIG. 14 is a cross sectional view of the light box of FIG. 9 wherein the light box is mounted to an angled window surface.
Figure 15:
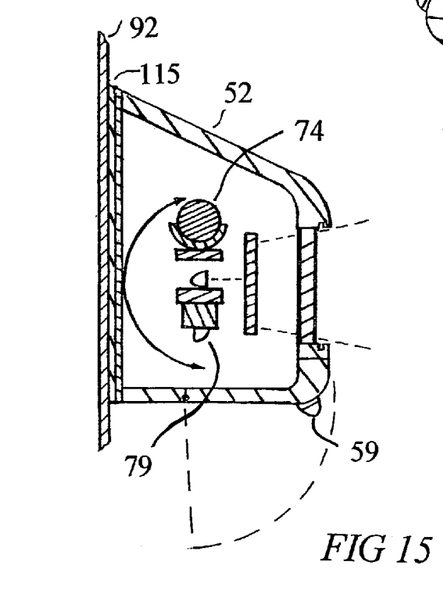
FIG. 15 is a cross sectional view of the light box of FIG. 9 wherein the light box is mounted to an outside surface of a vehicle or trailer.
Figure 16:
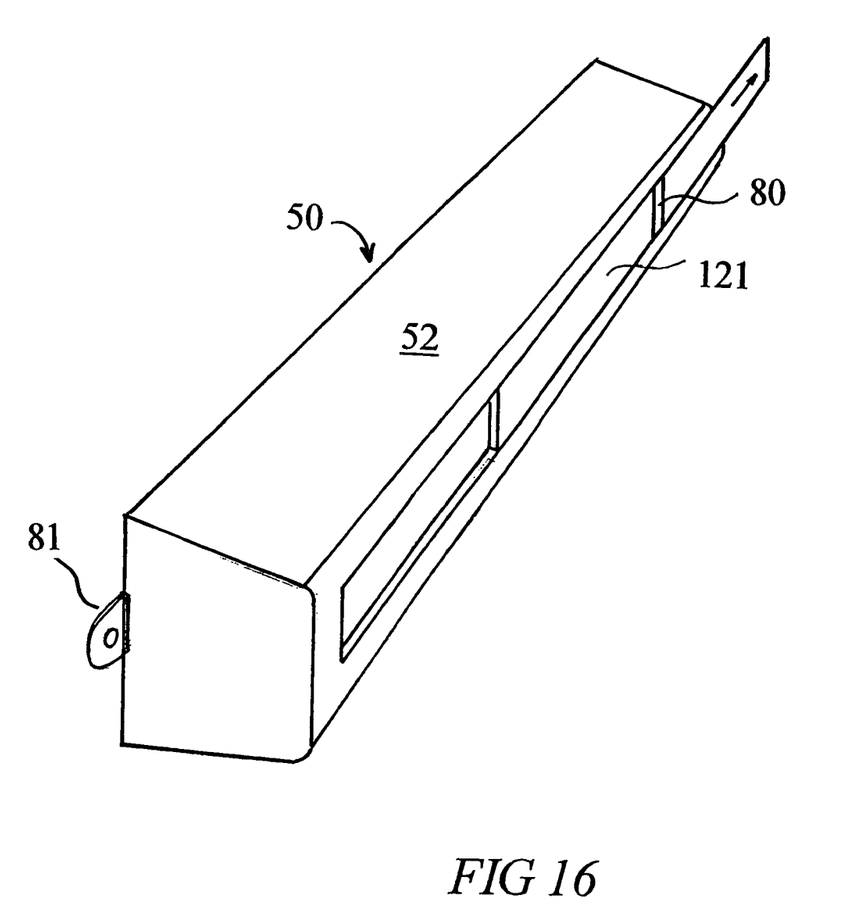
FIG. 16 is a perspective illustration of the invention showing the removable blackout panel with indicator light aperture. Note the tab for mounting to an outside surface of a vehicle, such as a truck or a trailer.
Figure 17:
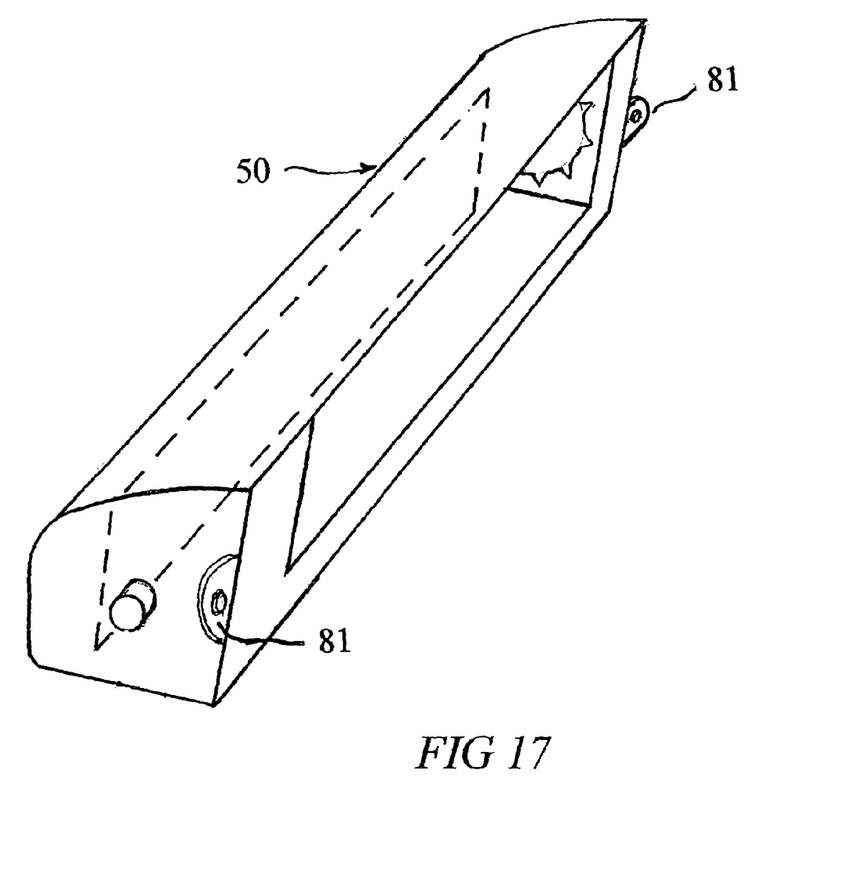
FIG. 17 is perspective view of the light box for mounting on the exterior of a vehicle. Note the mounting tabs. The one hundred and eighty degree rotation of the internal structures allows the light box to be mounted inside a window, or on the outside of a vehicle not having a rear window.
Figure 18:
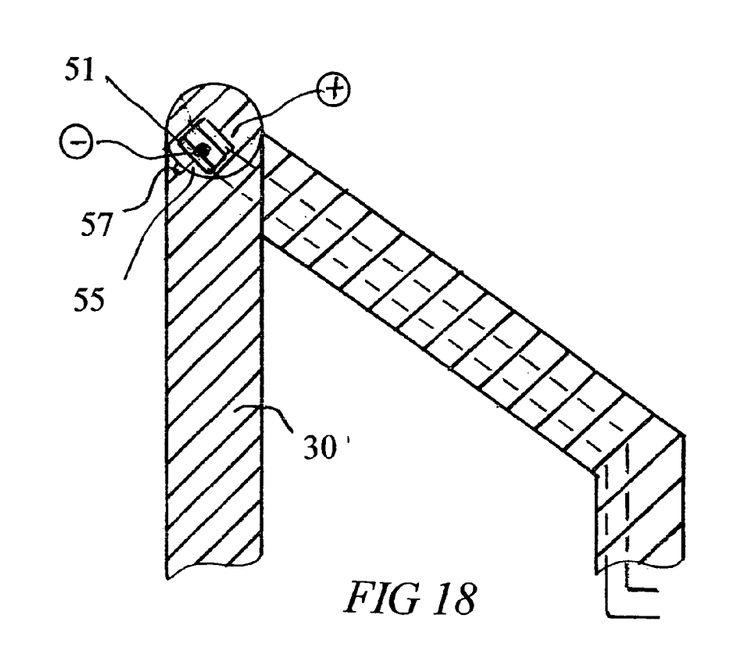
FIG. 18 is a cross section of a steering wheel showing the switch as part of the wheel and included during manufacture of the steering wheel.
Figure 19:
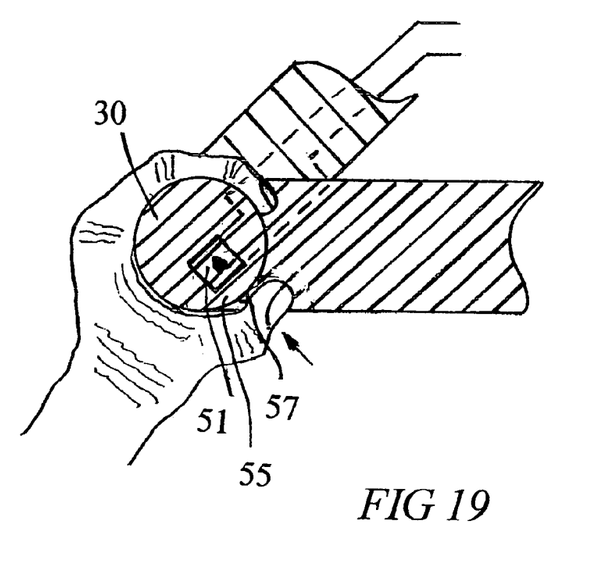
FIG. 19 is another cross section of a steering wheel showing the switch as part of the wheel and included during manufacture of the steering wheel. Note the position of the user's fingers and thumb in relation to the switch.
Figure 20:
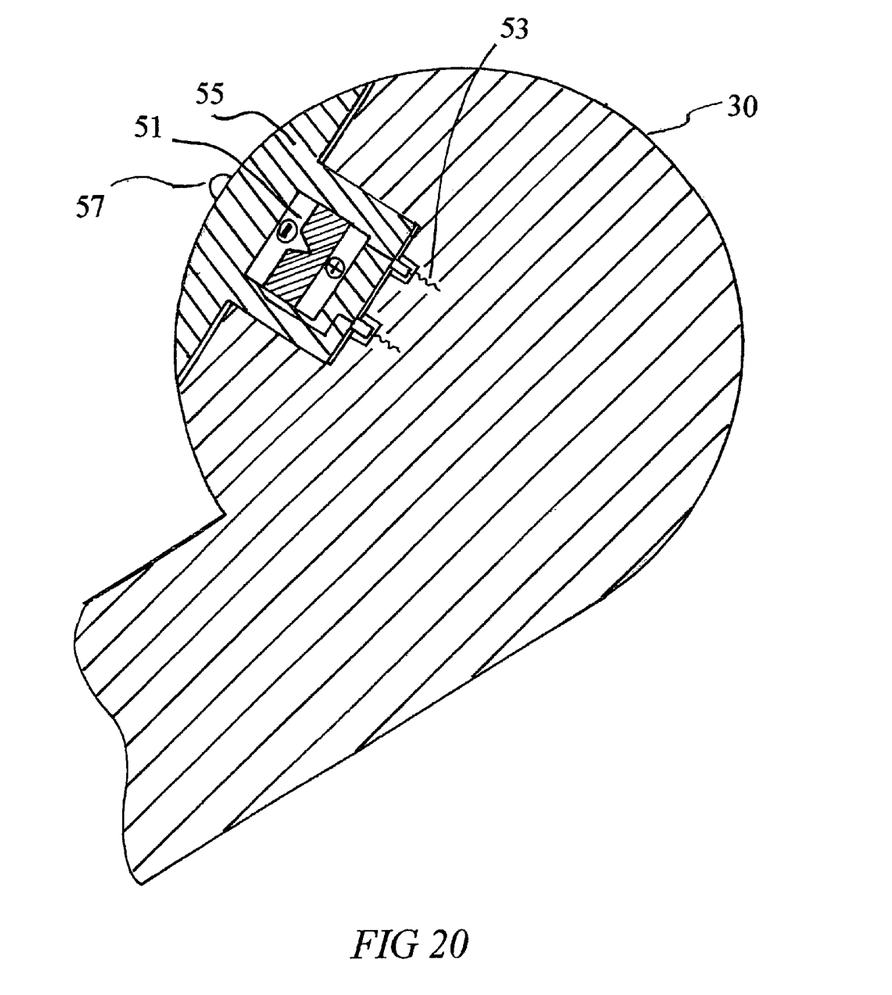
FIG. 20 is close up cross section of the steering wheel showing the switch made into the steering wheel upon manufacture. Note the bump or nodule to allow a user to feel the location of the switch.

With reference now to the drawings, and in particular to FIG. 1 thereof, the preferred embodiment of the new and improved rear-end collision warning light system embodying the principles and concepts of the present invention and generally designated by the reference numeral 10 will be described.

The present invention, the rear-end collision warning light system 10 is comprised of a plurality of components. Such components in their broadest context include a pressure sensor, an emergency light and a pair of electrical assemblies, one on the steering wheel and one in the light box. Such components are individually configured and correlated with respect to each other so as to attain the desired objective.

The present invention essentially comprises a rear-end collision warning light system. First provided is a vehicle 12. The vehicle has a body 14. The body has a front end 16 and a rear end 18. The vehicle has an interior 20. The vehicle has a front windshield 22. The vehicle has a dashboard 24. The front windshield is adjacent to the dashboard. The vehicle has a rear window 26. The vehicle has a torus shaped steering wheel 30. The vehicle has a plurality of wheels 32. Each wheel has an associated brake (not shown). The vehicle has a plurality of foot pedals. The foot pedals include an accelerator pedal (not shown) and a brake pedal 38. The brake pedal has an associated brake pedal switch 39. The system may have a cut-off switch (not shown) to disable the system.

The brake pedal switch is configured to be activated mechanically, by movement of the brake pedal, or hydraulically, by pressurization of the brake system of the vehicle. The brake pedal switch sends a first signal, via a vehicle electrical wiring system (not shown). When the present system is used in parallel with the brake pedal electrical system, both the brake pedal and the invention switch each send a first signal 47.

In the disclosed configuration there is immediate proximity of the user's hand to the pressure switch located in a steering wheel cover 21, or in a steering wheel, that activates the brake, or emergency, lights. This close position means that the time necessary between observation of a situation, that requires the application of brakes, and the first illumination of the brake lights, is minimized. In the present invention the pressure switch coupled to the steering wheel is positioned to be near the thumb of the driver. In this configuration, the user's thumb would be usually be resting on, or very near, the pressure sensor switch.

In other embodiments the vehicle may comprise a travel trailer, horse trailer, house trailer, box trailer, tractor trailer, or flatbed trailer. Also included are boat trailers and vehicle trailers.

A plurality of brake lights 40 are provided. These brake lights are sometimes referred to a stop lights. The brake lights are positioned on the rear end of the vehicle. The brake lights are electronically coupled to the brake pedal so as to be illuminated when the brake pedal is depressed. In this manner when the brake pedal is pressed the brake will be applied to the wheels and the brake lights will illuminate to warn following drivers that the brakes have been activated.

In other embodiments the brake lights may have an associated brake line pressure switch, also herein referred to as the "brake pedal switch". The brake pressure switch is coupled to a brake pressure pathway between a master cylinder (not shown) and the brake caliper or piston (not shown) as is commonly found in the art. In this configuration, the brake line pressure switch is actuated when the pressure within the brake pressure pathway reaches a critical, or preset, level, as normally occurs when the brake pedal is depressed.

Provided next is a pressure sensor 42. The pressure sensor is generally torus shaped. The pressure sensor is configured to be positioned on the steering wheel. The pressure sensor may be encased in or coupled to a steering wheel cover, as are commonly available. The steering wheel cover would allow a user to apply the invention to his or her steering wheel after purchasing the vehicle. One skilled in the art would recognize that the pressure sensor 51 may be fixed or replaceable, meaning if the pressure sensor failed, it could be easily and economically replaced by the user or a vehicle service technician.

In the preferred embodiment the pressure sensor is wired independent of the brake system of the vehicle. In the preferred embodiment the pressure sensor switch sends a first signal. This first signal may be via either a hard wired circuit, or the first signal may be transmitted via radio frequency or by a light means, such as an infra red light beam as is commonly used in various television remote controls. In the configuration in which a radio frequency is used to transmit the first signal, an encoder and decoder combination may be used.

The encoder receives the first signal from the pressure switch and then transmits the first signal via the encoder 45, and the receiver 76 receives the first signal and the decoder 49, which is associated with the receiver, then decodes the signal, sending the first signal on to the emergency light box. This allows the signal to be sent that can only be read by the receiver, preventing the signal from interpretation by any other devices in or near the vehicle.

Figure 21:
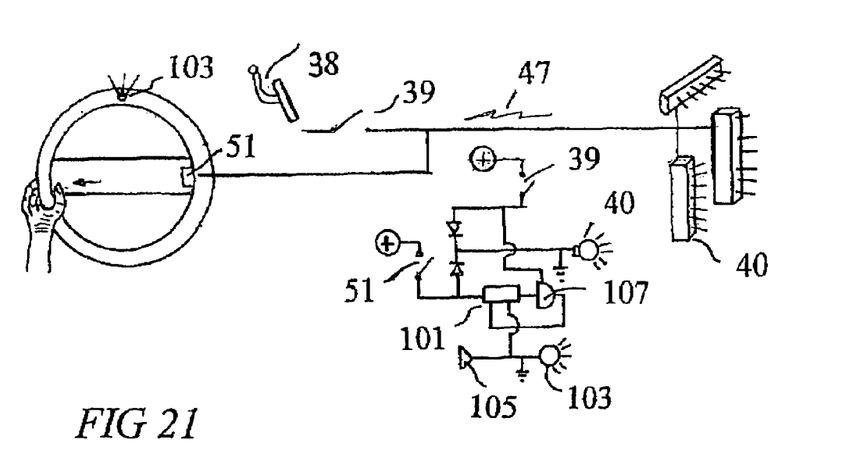
FIG. 21 is a diagram of the invention including the switch being in parallel with the brake light electrical system. Note the logic circuit and timer.
Figure 22:
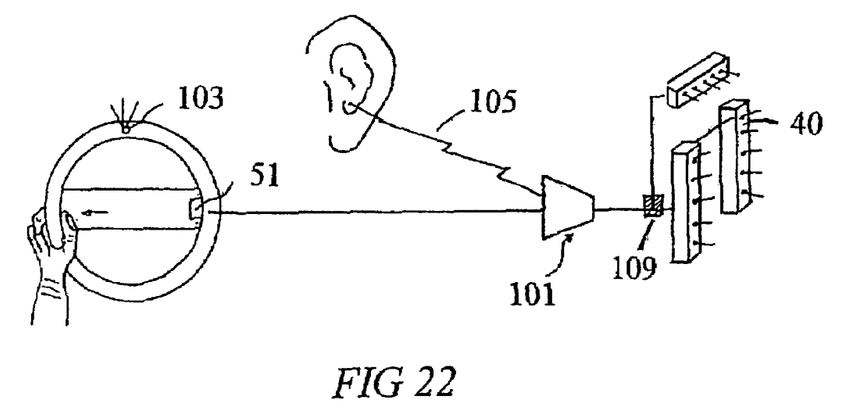
FIG. 22 is a drawing of the system having an auditory signal to let a user know when the emergency lights, or brake lights have been unintentionally activated.
Figure 23:
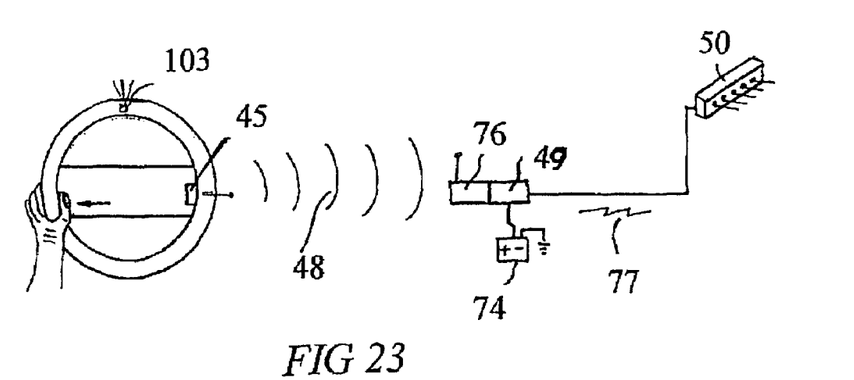
FIG. 23 is a drawing of the system using radio frequency to control the brake or signal lights. Note that such radio frequency could be used for manufacture of the steering wheel, or for an after-market placement of the system.

In other embodiments, however, the pressure sensor switch 51 is wired in parallel with the brake pedal switch (both mechanical switch and hydraulic switch). In this configuration, the pressure sensor switch and brake pedal switch each cause illumination of the same set of brake lights. In this configuration both the pressure sensor switch and the brake pedal switch each send a first signal as is shown in FIG. 21.

In the preferred embodiment the pressure sensor is continuous around the torus shape of the steering wheel. In other embodiments, the pressure switch may be located in at least one location on the steering wheel. In still another embodiment, the pressure switch may be located within the torus shape of the steering wheel.

In the preferred embodiment the pressure sensor has a first power source 44. One skilled in the art, however, would recognize that in other embodiments, the pressure sensor may be powered by the vehicle power source, or battery. The pressure sensor has a transmitter 46. A unique wireless signal 48 is provided. The pressure sensor is configured to produce the unique wireless signal when the pressure sensor is compressed or activated. The pressure sensor functions as a switch which is an instinctively activated switch that does not require searching in an emergency, preferably but not limited to a 360 degree circular switch.

Provided last is a light box 50 having an exterior and an interior. The light box has a closed top face 52, a closed bottom face 54 and a front face 56 having an external indicator light 59, though one skilled in the art would recognize that the light box may have a front face that is attached by any one of an attachment means, being screws, snaps, bolts, rivets, wires, hook and loop, hinges, adhesives, magnets and clips. In still another embodiment, the front face may be fixed with another side of the box providing access to the interior of the box.

The light box has a pair of closed side faces 58. The light box has a transparent rear face 60. The light box is configured to be attached, by adhesive 115, to the inner surface of the rear window 26 and further reinforced by magnets 27 adhered to the window's outer surface.

In the preferred embodiment, the light box has a plurality of LEDs 62 facing rearwardly. A central support 64 is provided. The LEDs are in a linear fashion fixed on the central support. The LEDs face the transparent rear face and rear window. The box includes a circular threaded ring 66. The teeth of the adjustment assembly 69 are rotated to thereby vary the angular orientation of the LEDs. A screw-on cap 70 secures the setting. In this manner the LEDs may be kept facing horizontally (parallel to the roadway) despite the contour of the area to which the box is attached.

In another embodiment the light box may be rectangular, or any geometrical shape, in configuration having an interior and an exterior. The light source, such as a light bulb, is located within the interior of the light box. The light bulb may be hard wired to the pressure switch located on the steering wheel, or a pressure switch located within the steering wheel. In this configuration there is a common power source for both the pressure sensor switch and the light box bulb.

The use of a first and second power sources, as well as the use of a radio frequency transmitted signal, or light transmitted signal, between the pressure switch and the light box, allows for a simple after-market approach for the deployment of the present system. However, during manufacture of a vehicle, a common power source, with hard wiring between the pressure switch and the light box may be more practical, and cost effective.

In the preferred embodiment the light box has a second power source 74. The second power source is electrically coupled to the LEDs of the light box, though, in another embodiment, a commonly used light bulb may be used instead of the LEDs.

The light box has an associated receiver 76. The receiver is configured to receive the unique wireless signal produced by the transmitter of the pressure sensor. When the pressure sensor on the steering wheel is compressed the unique wireless signal is sent from the transmitter on the pressure sensor to the receiver on the light box. The receiver then transmits, or sends, a second signal 77 to the LEDs in the light box. In this manner the LEDs are activated as a unique warning to following drivers and observers, such as passengers. This signal loop acts independently of the brakes, brake pedal and brake lights.

In an alternate embodiment the light box may have an interior forwardly facing indicator light 79 or LED which is associated with a forwardly facing aperture 80 in the light box. The indicator light is wired to be illuminated when the rearwardly facing lights or LEDs are illuminated. The indicator light 59 or 79 is viewable within a user's rear view mirror 15. In this configuration the user may test the circuit before moving the vehicle. The test would be simply performed, by applying pressure to the pressure switch and observing if the forwardly facing light then illuminates.

An alternate embodiment is configured to be part of a manufactured vehicle. This built-in system comprises the pressure sensitive switch 51 secured directly within the steering wheel 30 and a connecting wire 53 is coupled to all brake lights 40. There may be an indicator nub 57 which is adjacent the switch on the surface of the steering wheel. This would allow a user to feel the location of the switch. The switch is coated and protected by a flexible material 55. The electrical assembly further including a battery (not shown), preferably the battery of the vehicle.

In alternate embodiments of the present invention, the light box could be coupled to various areas of a vehicle facing rearwardly based on available room including but not limited to the rear window, a horizontal deck adjacent to the rear window, on the roof, on the trunk and on the rear face of a vehicle. Although able to be attached outside the vehicle, it is preferred to be somewhere on the interior of the vehicle to protect the components from the weather. It is preferably attached to the inner surface of the rear window 26.

In another embodiment, the central support is rotated 180 degrees so that the LEDs are facing the forward location of the system, which has an opening there into. This allows the flattened forward face to be attached to a smooth exterior surface of a vehicle, and still allow the system to function. This applies mainly, to vehicles not having a rear window. As sliding black out panel 121 is necessarily removed so all LEDs are rearwardly visible in this 180 degree rotated configuration.

It is understood that while a single vehicle is described here above, the pressure sensor could be on a steering wheel of a towing vehicle and the light box could also be on the rear surface 92 of a towed object including but not limited to a travel trailer, a horse trailer, a semi trailer, a boat trailer, a box trailer, a towed vehicle, an auto dolly, and a flat bed trailer. The emergency light could be on a tow vehicle and trailer combination. The device is attached with tabs 81. Of course, one skilled in the art would recognize that the device may be also be attached or coupled to the vehicle by any means, such as bolts, screws, clips, clamps, wires, fasteners, adhesives, magnets, glues or tapes.

The present invention allows a driver of a vehicle to illuminate emergency lights and thereby warn others of up-coming dangers in a more rapid manner. Such illumination is achieved by squeezing the steering wheel which supports the pressure sensor. The activation of the pressure sensor and lights is coupled to the squeezing of the steering wheel, the normal reaction of the hands of a driver in an emergency situation. This provides a more rapid and reliable means of activation. This warning system functions to react more rapidly than brakes and brake lights which are depended on a foot of a driver. The present invention thus provides observers in a following vehicle greater time to react to a dangerous situation and prevent injury or death and damage.

In another embodiment, the system may also be configured to have the pressure sensor switch in parallel to the brake pedal switch, with the pressure sensor switch and the brake pedal switch each electronically coupled to the brake system lights of the vehicle. The coupling of the pressure sensor switch to the brake lights of the vehicle may be either via transmitted signal, using radio frequency or light, or direct hard wiring. In this configuration, the pressure sensor switch would illuminate all brake lights of the vehicle when the pressure sensor switch was activated.

The system may also have an associated timer circuit and an associated "use warning" light 103 or "use warning" auditory signal 105, collectively referred to as the "use warning" signal. The "use warning" light is a light that is illuminated and provides a message that warns the driver that the pressure sensor is causing the illumination of the brake light system of the car, or the light box light of the system. The "use warning" auditory signal is an auditory signal that is generated and warns the driver that the pressure sensor is causing the illumination of the brake light system of the car, or the light box of the system, such as is the case where a driver grips the steering wheel with too firm a grasp, and causes the activation of the system. In this case, the following drivers would be confused by the brake lights being constantly on.

The timer 101 would be any type of commercially available timer circuits that would provide for the pressure sensor switch to send out a signal for a set period of time before the timer circuit would generate a "use warning" signal.

In practice the "use" circuit would function in the following way. Once the driver has gripped the steering wheel tight enough to activate the pressure sensor switch 51, and all brake lights 40, an electronic signal would be sent by hard wire to the timer circuit only if the brake pedal was not simultaneously pressed. The timer would commence to count the time until it reached a preset time, such as ten seconds. At that time the circuit would be configured to send out a "use warning" signal if the pressure sensor switch was still activated. If the pressure switch was no longer activated, the circuit would reset. If the pressure switch continued to be activated, the timer circuit would activate and transmit the "use warning" signal, which would then advise the driver that the warning system was being used.

In another embodiment, the brake pedal 39 switch may also be wired, via hard wire, to the timer switch. In this configuration, the pressure sensor switch and the brake pedal switch would be connected to a logic circuit, comprising components such as an AND gate as shown in FIG. 21.

If the pressure switch continued to be activated and the brake pedal switch was not activated, the timer would not be reset by the AND gate 107, and the "use warning" light 103 would be illuminated and the use warning auditory alarm 105 generated. If the pressure switch continued to be activated and the brake pedal switch was activated, the AND gate would send a signal to reset the timer, and the "use warning" light would not be illuminated. The added advantage of this wiring scheme is that the "use warning" light would also warn the driver who inadvertently placed his or her foot on the brake pedal and who inadvertently caused the illumination of the brake lights or in any way caused pressurization of the brake pressure pathway.

One skilled in the art would recognize that the system as herein disclosed may be made to be an on-demand system, meaning that the entire system may be activated or de-activated by a separate switch, so that the operator may select to use or not use the system in the vehicle so equipped.

Lastly, in another embodiment there may be a flasher 109 associated with the pressure sensor circuit, so that the activation of the pressure sensor would cause the flashing of the emergency or brake lights of the vehicle.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the spirit and scope of the invention.

What is claimed as being new and desired to be protected by Letters Patent of the United States is as follows:

1. A rear-end collision warning light system comprising:
    a vehicle having a steering wheel and a brake pedal switch with the brake pedal switch being configured to send an activation signal;
    a pressure sensor switch configured to be positioned on the steering wheel, upon detection of a pressure greater than an emergency indicating threshold, the pressure sensor switch configured to send the first signal, the pressure sensor switch located in parallel to the brake pedal switch;
    a timer circuit being operatively coupled to the system, the timer circuit having an associated use warning light with the use warning light being coupled to the vehicle; and
    a rearwardly facing brake light positioned on a vehicle, the rearwardly facing brake light being configured to receive and become illuminated upon receiving the first signal.

2. The rear-end collision warning light system of claim 1 wherein the timer circuit includes a logic circuit and a timer reset.

3. The rear-end collision warning light system of claim 1 wherein the system further includes a "use warning" signal.

4. The rear-end collision warning light system of claim 1 wherein a wheeled object is the vehicle which contains the steering wheel with the pressure sensor.

5. The rear-end collision warning light system of claim 1 wherein the system further comprises a flasher being associated with the brake lights.

6. A rear-end collision warning light system comprising:
    a vehicle having a steering wheel and a brake system comprising a brake pedal and a brake switch and a brake pressure line and brake system wires and at least one brake light;
    a pressure sensor switch configured to be positioned on the steering wheel, upon detection of a pressure greater than an emergency indicating threshold, the pressure sensor switch sending an activation signal upon activation;
    the pressure sensor switch located in parallel to the brake pedal switch;
    a timing circuit electronically coupled to the pressure sensor switch, the timing circuit having an associated use warning light with the use warning light being coupled to the vehicle and,
    the brake light configured to receive the activation signal.

7. The rear-end collision warning light system of claim 6 wherein the pressure sensor switch has a first power source.

8. The rear-end collision warning light system of claim 7 wherein the brake light has a second power source associated therewith.

9. The rear-end collision warning light system of claim 8 wherein the system is wired independently of the vehicle brake system.

10. The rear-end collision warning light system of claim 6 wherein the pressure sensor switch is electronically connected in parallel to the brake switch.

11. The rear-end collision warning light system of claim 6 wherein the timer circuit includes a logic circuit and a timer reset.

12. The rear-end collision warning light system of claim 11 wherein the timer circuit also includes the brake switch being electronically connected to the logic circuit.

13. The rear-end collision warning light system as set forth in claim 6 wherein the pressure sensor is an instinctively activated switch that does not require searching in an emergency.

14. The rear-end collision warning light system as set forth in claim 6 wherein the system further includes an encoder electronically coupled to the pressure switch, the encoder being used to encode and transmit the first signal, a receiver having an associated decoder wherein the decoder decodes the first signal and then sends the first signal on to the emergency lights.

15. The rear-end collision warning light system as set forth in claim 6 wherein there is further included a flasher.

16. The rear-end collision warning light system of claim 1 wherein the system further comprises a brake light aligned parallel with the roadway.

17. The rear-end collision warning light system of claim 1 wherein the system further comprises a cut off switch.

18. The rear-end collision warning light system of claim 1 wherein the rearwardly facing brake light positioned on a vehicle is held in place by magnets.

19. The rear-end collision warning light system of claim 1 wherein the pressure sensor switch is removable for easy replacement.

\* \* \* \* \*